(12) United States Patent
Long et al.

(10) Patent No.: US 8,554,233 B2
(45) Date of Patent: Oct. 8, 2013

(54) MOBILITY MANAGEMENT METHOD, SERVING GPRS SUPPORT NODE OR MOBILITY MANAGEMENT ENTITY, AND TERMINAL

(75) Inventors: Shuiping Long, Beijing (CN); Rui Wang, Beijing (CN); Hui Jin, Beijing (CN); Xiaojuan Li, Beijing (CN)

(73) Assignee: Huawei Device Co., Ltd, Shenzhen (CN)

( * ) Notice: Subject to any disclaimer, the term of this patent is extended or adjusted under 35 U.S.C. 154(b) by 0 days.

(21) Appl. No.: 13/543,604

(22) Filed: Jul. 6, 2012

(65) Prior Publication Data

US 2012/0270547 A1    Oct. 25, 2012

Related U.S. Application Data

(63) Continuation of application No. PCT/CN2011/070053, filed on Jan. 6, 2011.

(30) Foreign Application Priority Data

Jan. 11, 2010    (CN) .......................... 2010 1 0003404

(51) Int. Cl.
*H04W 40/00*    (2009.01)
(52) U.S. Cl.
USPC ............... 455/445; 455/432.1; 455/435.1; 455/436; 455/433; 370/331; 370/328; 370/338; 370/392
(58) Field of Classification Search
USPC .... 455/432.1–436, 445, 67.11; 370/328–338
See application file for complete search history.

(56) References Cited

U.S. PATENT DOCUMENTS

| 6,819,659 | B1 * | 11/2004 | Palat et al. ..................... 370/331 |
| 6,865,164 | B1 * | 3/2005 | Scribano et al. ............... 370/328 |
| 7,197,312 | B2 * | 3/2007 | Gunaratnam et al. ........ 455/445 |

(Continued)

FOREIGN PATENT DOCUMENTS

| CN | 1462122 A | 12/2003 |
| CN | 1988715 A | 6/2007 |

(Continued)

OTHER PUBLICATIONS

International Search Report and Written Opinion of the International Searching Authority issued in corresponding PCT Patent Application No. PCT/CN2011/070053, mailed Apr. 21, 2011.

(Continued)

*Primary Examiner* — Sharad Rampuria
(74) *Attorney, Agent, or Firm* — Huawei Device Co., Ltd

(57) ABSTRACT

The present invention discloses a mobility management method, a serving GPRS support node or mobility management entity (SGSN/MME), and a terminal to solve the problem of setting or dynamically modifying the mobility management frequency of a particular terminal among numerous terminals. The technical solution of the present invention includes: obtaining subscription data of a terminal, where the subscription data carries periodic routing area update or tracking area update (RAU/TAU) setting information; obtaining a periodic RAU/TAU timer of the terminal according to the periodic RAU/TAU setting information; sending the periodic RAU/TAU timer of the terminal to the terminal; and setting a value that is a little longer than the periodic RAU/TAU timer of the terminal as a mobile reachable timer for monitoring the periodic RAU/TAU of the terminal. The embodiments of the present invention may be applied in low-mobility machine-type communication.

3 Claims, 11 Drawing Sheets

(56) References Cited

U.S. PATENT DOCUMENTS

| | | | |
|---|---|---|---|
| 7,693,506 B1* | 4/2010 | Back et al. | 455/432.1 |
| 8,170,566 B2* | 5/2012 | Pudney | 455/445 |
| 8,428,029 B2* | 4/2013 | Fox et al. | 370/331 |
| 2004/0013116 A1* | 1/2004 | Greis et al. | 370/392 |
| 2005/0239461 A1* | 10/2005 | Verma et al. | 455/435.1 |
| 2007/0129078 A1* | 6/2007 | De Beer | 455/445 |
| 2008/0220782 A1* | 9/2008 | Wang et al. | 455/436 |
| 2008/0259912 A1* | 10/2008 | Wang et al. | 370/356 |
| 2009/0176496 A1* | 7/2009 | Li et al. | 455/437 |
| 2009/0305707 A1* | 12/2009 | Pudney | 455/445 |
| 2011/0171926 A1* | 7/2011 | Faccin et al. | 455/404.1 |
| 2012/0039313 A1* | 2/2012 | Jain | 370/338 |
| 2012/0076121 A1* | 3/2012 | Choi et al. | 370/338 |

FOREIGN PATENT DOCUMENTS

| | | | |
|---|---|---|---|
| CN | 101179838 A | | 5/2008 |
| CN | 101409901 A | | 4/2009 |
| CN | 101415171 A | | 4/2009 |
| EP | 2071892 A2 | | 6/2009 |
| WO | WO 02/03719 A2 | | 1/2002 |
| WO | WO 03/063535 A1 | | 7/2003 |
| WO | WO 2007/080399 A1 | | 7/2007 |
| WO | WO 2009/092115 A2 | | 7/2009 |

OTHER PUBLICATIONS

LTE, "3$^{rd}$ Generation Partnership Project; Technical Specification Group Services and System Aspects; System Improvements for Machine-Type Communications" (Release 10) 3GPP TR 23.888. V1.2, Jan. 2010. With markups.

LTE, "3$^{rd}$ Generation Partnership Project; Technical Specification Group Services and System Aspects; System Improvements for Machine-Type Communications" (Release 10) 3GPP TR 23.888. V1.2, Jan. 2010.

Office Action issued in corresponding Chinese Patent Application No. 201010003404.8, mailed Dec. 3, 2012.

Extended European Search Report issued in corresponding European Patent Application No. 11731675.2, mailed Oct. 16, 2012.

2nd office action issued in corresponding Chinese patent application 201010003404.8, dated May 22, 2013, and English translation thereof, total 40 pages.

* cited by examiner

MOBILITY MANAGEMENT METHOD, SERVING GPRS SUPPORT NODE OR MOBILITY MANAGEMENT ENTITY, AND TERMINAL

This application is a continuation of international Application No. PCT/CN2011/070053, filed on Jan. 6, 2011, which claims priority to Chinese Patent Application No, 201010003404.8, filed on Jan. 11, 2010, both of which are hereby incorporated by reference in their entireties.

FIELD OF THE INVENTION

The present invention relates to the mobile communication field, and in particular, to a mobility management method, a serving GPRS support node or mobility management entity, and a terminal.

BACKGROUND OF THE INVENTION

In a conventional mobility management (Mobility Management, MM) technology, a terminal, such as a user equipment (User Equipment, UE) or a mobile station (Mobile Station, MS), performs a periodic routing area update (Routing Area Update, RAU) or tracking area update (Tracking Area Update, TAU), and the RAU/TAU interval (or known as a periodic RAU/TAU timer) is controlled by a serving GPRS support node (Service GPRS Support Node, SGSN) or a mobility management entity (Mobility Management Entity; MME), where the RAU is performed with the SGSN and the TAU is performed with the MME.

The SGSN/MME may send a periodic RAU/TAU timer (Periodic RAU/TAU Timer) to the terminal through an Attach Accept (Attach Accept) or RAU/TAU Accept (RAU/TAU Accept) message, and this timer is unique in one routing area (Routing Area, RA) or in one tracking area identity (Tracking Area Identity, TAI) list, that is, all terminals in a certain area use the same timer.

The terminal runs the periodic RAU/TAU timer locally, and upon expiry of the timer, the terminal initiates a periodic RAU/TAU procedure and restarts the timer. Accordingly, the SGSN/MME has a mobile reachable timer (Mobile Reachable Timer), and this timer is a little longer than the Periodic RAU/TAU Timer (for example, 20 seconds or 1 minute longer), and is used for monitoring the periodic RAU/TAU procedure of the terminal. If the mobile reachable timer expires, the SGSN/MME clears a paging proceed flag (Paging Proceed Flag, PPF) to zero, so that the SGSN/MME does not perform terminal paging.

When implementing the present invention, the inventor discovers that the conventional mobility management technology cannot set or dynamically modify the mobility management frequency of a particular terminal among numerous terminals.

SUMMARY OF THE INVENTION

Embodiments of the present invention provide a mobility management method and an SGSN/MME, which can set or dynamically modify the mobility management frequency of a particular terminal among numerous terminals.

To achieve the foregoing objective, the embodiments of the present invention adopt the following technical solution:

A mobility management method includes: obtaining subscription data of a terminal, where the subscription data carries periodic RAU/TAU setting information; obtaining a periodic RAU/TAU timer of the terminal according to the periodic RAU/TAU setting information; sending the periodic RAU/TAU timer of the terminal to the terminal; and setting a value, which is a little longer than the periodic RAU/TAU timer of the terminal, as a mobile reachable timer for monitoring a periodic RAU/TAU of the terminal.

An SGSN/MME includes: a subscription data obtaining unit, configured to obtain subscription data of a terminal, where the subscription data carries periodic. RAU/TAU setting information; a timer obtaining unit, configured to obtain a periodic RAU/TAU timer of the terminal according to the periodic RAU/TAU setting information; a timer sending unit, configured to send the periodic RAU/TAU timer of the terminal to the terminal; and a setting unit, configured to set a value, which is a little longer than the periodic RAU/TAU timer of the terminal, as a mobile reachable timer for monitoring a periodic RAU/TAU of the terminal.

The mobility management method and the SGSN/MME according to the embodiments of the present invention obtain the periodic RAU/TAU setting information of the network with respect to the terminal through the subscription data, obtain the periodic RAU/TAU timer of the terminal according to the periodic RAU/TAU setting information, and send the periodic RAU/TAU timer to the terminal, and meanwhile set a value, which is a little longer than the periodic RAU/TAU timer of the terminal, as a mobility reachable timer for monitoring the periodic RAU/TAU of the terminal, thereby achieving the objective of setting or dynamically modifying the mobility management frequency of a particular terminal, and solving the problem that the prior art cannot set or dynamically modify the mobility management frequency of a particular terminal among numerous terminals.

The embodiments of the present invention also provide a mobility management method and an SGSN/MME, which can set or dynamically modify a mobility management frequency of a particular terminal among numerous terminals.

To achieve the foregoing objective, the embodiments of the present invention adopt the following technical solution:

A mobility management method includes: obtaining subscription data of a terminal, where the subscription data carries a periodic RAU/TAU deactivation indicator; sending deactivation information of a periodic RAU/TAU timer to the terminal according to the periodic RAU/TAU deactivation indicator; and stopping a mobile reachable timer so as to stop monitoring a periodic RAU/TAU of the terminal.

An SGSN/MME includes: a subscription data obtaining unit, configured to obtain subscription data of a terminal, where the subscription data carries a periodic RAU/TAU deactivation indicator; a deactivation information sending unit, configured to send deactivation information of a periodic RAU/TAU timer to the terminal according to the periodic RAU/TAU deactivation indicator; and a stopping unit, configured to stop a mobile reachable timer so as to stop monitoring a periodic RAU/TAU of the terminal.

The mobility management method and the SGSN/MME according to the embodiments of the present invention obtain the periodic RAU/TAU deactivation indicator of the network with respect to the terminal through the subscription data, send the deactivation information of the periodic RAU/TAU timer to the terminal according to the periodic RAU/TAU deactivation indicator, and meanwhile stop the mobile reachable timer so as to stop monitoring the periodic RAU/TAU of the terminal. Thereby, the mobility management frequency of a particular terminal may be decreased, the utilization of network resources may be improved, the objective of setting or dynamically modifying the mobility management frequency of a particular terminal is achieved, and the problem that the prior art cannot set or dynamically modify the mobility management frequency of a particular terminal among numerous terminals is solved.

For the terminal, the embodiments of the present invention provide a mobility management method and a terminal, which can set or dynamically modify, in cooperation with the network, the mobility management frequency of a particular terminal among numerous terminals.

To achieve the foregoing objective, the embodiments of the present invention adopt the following technical solution:

A mobility management method includes: receiving a periodic RAU/TAU timer from an SGSN/MME, where the periodic RAU/TAU timer is obtained by the SGSN/MME according to periodic RAU/TAU setting information in subscription data; and executing a periodic RAU/TAU according to the received periodic RAU/TAU timer.

A terminal includes: a timer receiving unit, configured to receive a periodic RAU/TAU timer from an SGSN/MME, where the periodic RAU/TAU timer is obtained by the SGSN/MME according to periodic RAU/TAU setting information in subscription data; and a RAU/TAU executing unit; configured to execute a periodic RAU/TAU according to the received periodic RAU/TAU timer.

In the mobility management method and the terminal according to the embodiments of the present invention, the terminal receives the periodic RAU/TAU timer that is obtained by the SGSN/MME according to the periodic RAU/TAU setting information in the subscription data, and executes a periodic. RAU/TAU according to the received periodic RAU/TAU timer. Thereby, the terminal can set or dynamically modify, in cooperation with the network, the mobility management frequency of a particular terminal among numerous terminals.

For the terminal, the embodiments of the present invention also provide a mobility management method and a terminal, which can set or dynamically modify, in cooperation with the network, the mobility management frequency of a particular terminal among numerous terminals.

To achieve the foregoing objective, the embodiments of the present invention adopt the following technical solution:

A mobility management method includes: receiving deactivation information of a periodic RAU/TAU timer from an SGSN/MME, where the deactivation information is sent by the SGSN/MME according to a periodic RAU/TAU deactivation indicator in subscription data; and stopping executing a periodic RAU/TAU according to the received deactivation information of the periodic RAU/TAU timer.

A terminal includes: a deactivation information receiving unit, configured to receive deactivation information of a periodic RAU/TAU timer from an SGSN/MME, where the deactivation information is sent by the SGSN/MME according to a periodic RAU/TAU deactivation indicator in subscription data; and a RAU/TAU stopping unit, configured to stop executing a periodic RAU/TAU according to the deactivation information of the periodic RAU/TAU timer received by the deactivation information receiving unit.

In the mobility management method and the terminal according to the embodiments of the present invention, the terminal receives the deactivation information of the periodic RAU/TAU timer that is sent by the SGSN/MME according to the periodic RAU/TAU deactivation indicator in the subscription data, and stops executing the periodic RAU/TAU according to the received deactivation information of the periodic RAU/TAU timer. Thereby, the terminal can set or dynamically modify, in cooperation with the network, the mobility management frequency of a particular terminal among numerous terminals.

BRIEF DESCRIPTION OF THE DRAWINGS

To make the technical solution of the embodiments of the present invention clearer, the accompanying drawings used in the description of the embodiments are briefly described below. Evidently, the accompanying drawings illustrate only some exemplary embodiments of the present invention and persons skilled in the art may obtain other drawings based on these drawings without creative efforts.

DETAILED DESCRIPTION OF THE EMBODIMENTS

The technical solution of the embodiments of the present invention is described clearly in the following with reference to the accompanying drawings in the embodiments of the present invention. It is evident that the described embodiments are only some exemplary embodiments of the present invention, rather than all embodiments of the present invention. All other embodiments that persons skilled in the art obtain without creative efforts based on the embodiments of the present invention also fall within the protection scope of the present invention.

Figure 1:
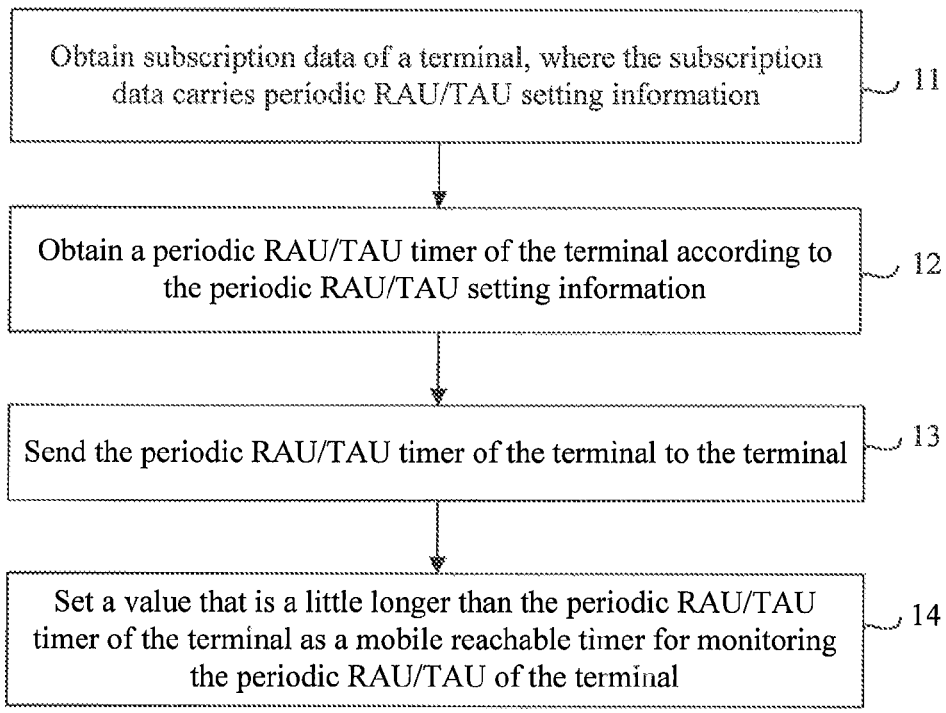
FIG. 1 is a flowchart of a mobility management method according to an embodiment of the present invention.

As shown in FIG. 1, a mobility management method according to an embodiment of the present invention includes the following steps:

Step 11: Obtain subscription data of a terminal, where the subscription data carries periodic RAU/TAU setting information.

An SGSN/MME may use one of the following two ways to obtain the periodic RAU/TAU setting information of the terminal from a home location register (Home Location Register, HLR) or home subscriber server (Home Subscriber Server HSS):

First way: In the attach procedure of the terminal, when the SGSN/MME receives an Attach Request from the terminal, the SGSN/MME sends an Update Location message to the HLR/HSS and receives the subscription data sent by the HLR/HSS, where the subscription data carries the periodic RAU/TAU setting information.

Second way: If the terminal has attached, when the HLR/HSS needs to reset the periodic RAU/TAU of the terminal, the HLR/HSS sends new subscription data to the SGSN/MME, where the subscription data carries the periodic RAU/TAU setting information. The scenarios where the HLR/HSS resets the periodic RAU/TAU of the terminal include a scenario where the HLR/HSS has previously set the periodic RAU/TAU of the terminal or a scenario where the terminal uses a normal periodic RAU/TAU timer.

The periodic RAU/TAU setting information carried in the subscription data includes:

A1. a multiplication factor of the normal periodic RAU/TAU timer; or

B1. a specified periodic RAU/TAU timer; or

C1. an increment value of the normal periodic RAU/TAU timer.

In any one of the above ways, the message (Insert Subscriber Data) used by the conventional HLR/HSS for sending the subscription data to the SGSN/MME needs to be enhanced. For example, a parameter Periodic RAU/TAU Timer Multiplication Factor is added, 8-bit coding is used, and the multiplication factor takes a value from 0 to 255 (0 may be used to indicate that the periodic RAU/TAU is deactivated). For example, a parameter Predefined Periodic RAU/TAU Timer is added, and 8-bit coding is used, where 5 bits represent a timer value and 3 bits define a unit of the timer value, such as 1 hour, 1 day, 1 week, and 1 month. For example, a parameter Periodic RAU/TAU Timer Increment is added to represent an increment value for the normal periodic RAU/TAU timer.

Step 12: Obtain a periodic RAU/TAU timer of the terminal according to the periodic RAU/TAU setting information.

After the SGSN/MME receives the periodic RAU/TAU setting information of the terminal, the following three possible processing ways may be used to obtain the periodic RAU/TAU timer of the terminal:

A2, when the periodic RAU/TAU setting information is a multiplication factor of the normal periodic RAU/TAU timer, obtaining the normal periodic RAU/TAU timer and multiplying the normal periodic RAU/TAU timer with the multiplication factor to obtain the periodic RAU/TAU timer of the terminal; or B2, when the periodic RAU/TAU setting information is a specified periodic RAU/TAU timer, directly using the specified periodic RAU/TAU timer as the periodic RAU/TAU timer of the terminal; or C2, when the periodic RAU/TAU setting information is an increment value of the normal periodic RAU/TAU timer, obtaining the normal periodic RAU/TAU timer and adding the increment value to the normal periodic RAU/TAU timer to obtain the periodic RAU/TAU timer of the terminal.

Step 13: Send the periodic RAU/TAU timer of the terminal to the terminal.

Corresponding to the two ways for the SGSN/MME to obtain the periodic RAU/TAU setting information of the terminal, the following two ways may be used by the SGSN/MME to send the periodic RAU/TAU timer of the terminal to the terminal:

First way: In the attach procedure of the terminal, the SGSN/MME, sends an Attach Accept message to the terminal, where the Attach Accept message carries the periodic RAU/TAU timer of the terminal.

Second way: If the terminal has attached, the SGSN/MME sends a RAU/TAU Accept message to the terminal, where the RAU/TAU Accept message carries the periodic RAU/TAU timer of the terminal.

It should be noted that in order to support a longer RAU/TAU interval than that of the prior art, the value unit part of the conventional general packet radio service (General Packet Radio Service, GPRS) timer information element (Information Element, IE) may be enhanced. The conventional GPRS Timer IE is defined as follows (excerpted from 3GPP TS 24.008):

| 8 | 7 | 6 | 5 | 4 | 3 | 2 | 1 | |
|---|---|---|---|---|---|---|---|---|
| GPRS Timer IEI (IE Identifier or IE identity) | | | | | | | | octet 1 |
| Value unit (Unit) | | | Timer value (Timer value) | | | | | octet 2 | where,
Timer value (octet 2)
Bits 5 to 1 represent the binary coded timer value. (Bits 1 to 5 represent the binary timer value.)
Bits 6 to 8 define the timer value unit for the GPRS timer as follows
(Bits 6 to 8 define the timer value unit for the GPRS timer as follows):
Bits
8 7 6
0 0 0 value is incremented in multiples of 2 seconds (value is incremented in multiples of 2 seconds)
0 0 1 value is incremented in multiples of 1 minute (value is incremented in multiples of 1 minute)
0 1 0 value is incremented in multiples of decihours (value is incremented in multiples of decihours)
1 1 1 value indicates that the timer is deactivated (value indicates that the timer is deactivated)
Other values shall be interpreted as multiples of 1 minute in this version of the protocol (Other values shall be interpreted as multiples of 1 minute in this version of the protocol).

Specifically, the present invention may define several new coded values for the timer value unit (Timer Value Unit) to obtain a bigger time unit. For example, value unit codes 011, 100, 101, and 110 may be added and are respectively defined as follows: 011 means that the unit is 1 hour, 100 means that the unit is 10 hours, 101 means that the unit is 100 hours, and 110 means that the unit is 1000 hours; or 011 means that the unit is 1 hour, 100 means that the unit is 1 day, 101 means that the unit is 1 week, 110 means that the unit is 1 month, and so on. All these newly added value units are bigger than the conventional maximum value unit, that is, 6 minutes.

Step 14: Set a value that is a little longer than the periodic RAU/TAU timer of the terminal as a mobile reachable timer for monitoring the periodic RAU/TAU of the terminal.

As with the conventional mobility management method, the SGSN/MME needs to set a value, which is a little longer than the periodic RAU/TAU timer of the terminal, as the mobile reachable timer for monitoring the periodic RAU/TAU of the terminal. If the mobile reachable timer expires, the SGSN/MME clears a paging proceed flag PPF to zero, so that the SGSN/MME does not perform terminal paging.

The mobility management method according to this embodiment of the present invention obtains the periodic RAU/TAU setting information of the network with respect to the terminal through the subscription data, obtains the periodic RAU/TAU timer of the terminal according to the periodic RAU/TAU setting information, and sends the periodic RAU/TAU timer to the terminal, and meanwhile sets a value, which is a little longer than the periodic RAU/TAU timer of the terminal, as a mobility reachable timer for monitoring the periodic RAU/TAU of the terminal, thereby achieving the objective of setting or dynamically modifying the mobility management frequency of a particular terminal, and solving the problem that the prior art cannot set or dynamically modify the mobility management frequency of a particular terminal among numerous terminals. In addition, by setting or dynamically modifying the periodic RAU/TAU timer of a particular terminal to a RAU/TAU interval that is longer than the normal periodic RAU/TAU timer, the utilization of the network resources may be improved.

Figure 2:
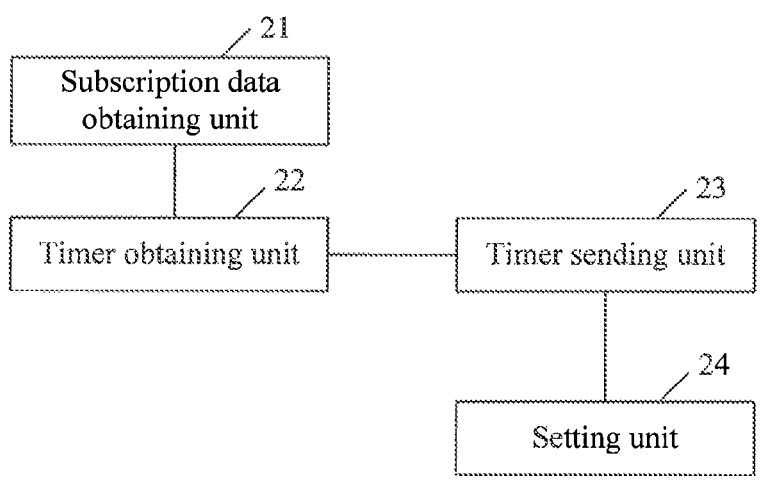
FIG. 2 is a first schematic structural diagram of an SGSN/MME according to an embodiment of the present invention.

Based on the mobility management method according to the embodiment of the present invention, as shown in FIG. 2, an embodiment of the present invention provides an SGSN/MME, including:

a subscription data obtaining unit 21, configured to obtain subscription data of a terminal, where the subscription data carries periodic RAU/TAU setting information;

a timer obtaining unit 22, configured to obtain a periodic RAU/TAU timer of the terminal according to the periodic RAU/TAU setting information;

a timer sending unit 23, configured to send the periodic RAU/TAU timer of the terminal to the terminal; and a setting unit 24, configured to set a value, which is a little longer than the periodic RAU/TAU timer of the terminal, as a mobile reachable timer for monitoring the periodic RAU/TAU of the terminal.

Figure 3:
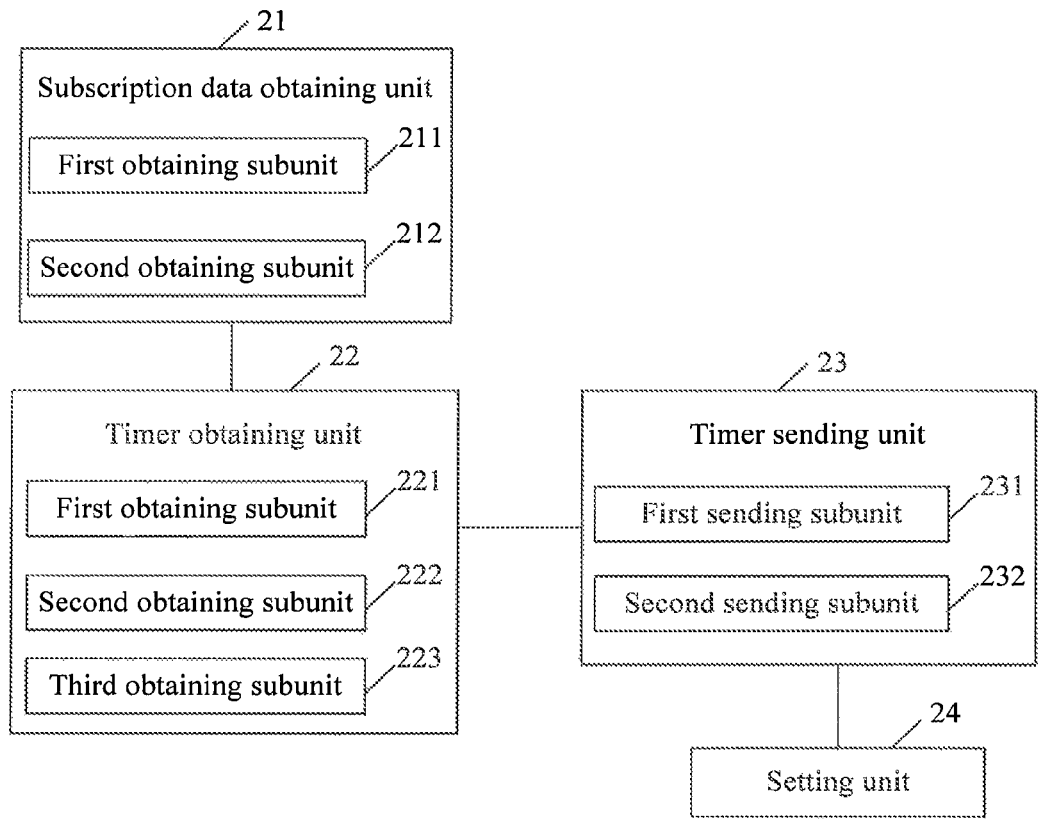
FIG. 3 is a second schematic structural diagram of an SGSN/MME according to an embodiment of the present invention.

Further, as shown in FIG. 3, the subscription data obtaining unit 21 may include:

a first obtaining subunit 211, configured to send, after receiving an Attach Request from the terminal, an Update Location message to an HLR/HSS, and receive the subscription data sent by the HLR/HSS, where the subscription data carries the periodic RAU/TAU setting information; or a second obtaining subunit 212, configured to receive, when the HLR/HSS resets the periodic RAU/TAU of the terminal, the subscription data sent by the HLR/HSS, where the subscription data carries the periodic RAU/TAU setting information.

The timer obtaining unit 22 may include any one of the following subunits:

a first obtaining subunit 221, configured to obtain, when the periodic RAU/TAU setting information is a multiplication factor of a normal periodic RAU/TAU timer, the normal periodic RAU/TAU timer and multiply the normal periodic RAU/TAU timer with the multiplication factor to obtain the periodic RAU/TAU timer of the terminal;

a second obtaining subunit 222, configured to directly use, when the periodic RAU/TAU setting information is a specified periodic RAU/TAU timer, the specified periodic RAU/TAU timer as the periodic RAU/TAU timer of the terminal; or a third obtaining subunit 223, configured to obtain, when the periodic RAU/TAU setting information is an increment value of the normal periodic RAU/TAU timer, the normal periodic RAU/TAU timer and add the increment value to the normal periodic RAU/TAU timer to obtain the periodic RAU/TAU timer of the terminal.

Corresponding to the subunits included in the subscription data obtaining unit 21, the timer sending unit 23 may include:

a first sending subunit 231, configured to send an Attach Accept message to the terminal, where the Attach Accept message carries the periodic RAU/TAU timer of the terminal; or a second sending subunit 232, configured to send a RAU/TAU Accept message to the terminal, where the RAU/TAU Accept message carries the periodic RAU/TAU timer of the terminal.

For the specific implementation method of the SGSN/MME; according to the embodiment of the present invention, reference may be made to the mobility management method according to the embodiment of the present invention, which is not described here again.

In the SGSN/MME according to this embodiment of the present invention, the subscription data obtaining unit 21 obtains the periodic RAU/TAU setting information of the network with respect to the terminal, the timer obtaining unit 22 obtains the periodic RAU/TAU timer of the terminal according to the periodic RAU/TAU setting information, and the timer sending unit 23 sends the periodic RAU/TAU timer to the terminal, and meanwhile the setting unit 24 sets a value, which is a little longer than the periodic RAU/TAU timer of the terminal, as a mobility reachable timer for monitoring the periodic RAU/TAU of the terminal, thereby achieving the objective of setting or dynamically modifying the mobility management frequency of a particular terminal, and solving the problem that the prior art cannot set or dynamically modify the mobility management frequency of a particular terminal among numerous terminals.

Figure 4:
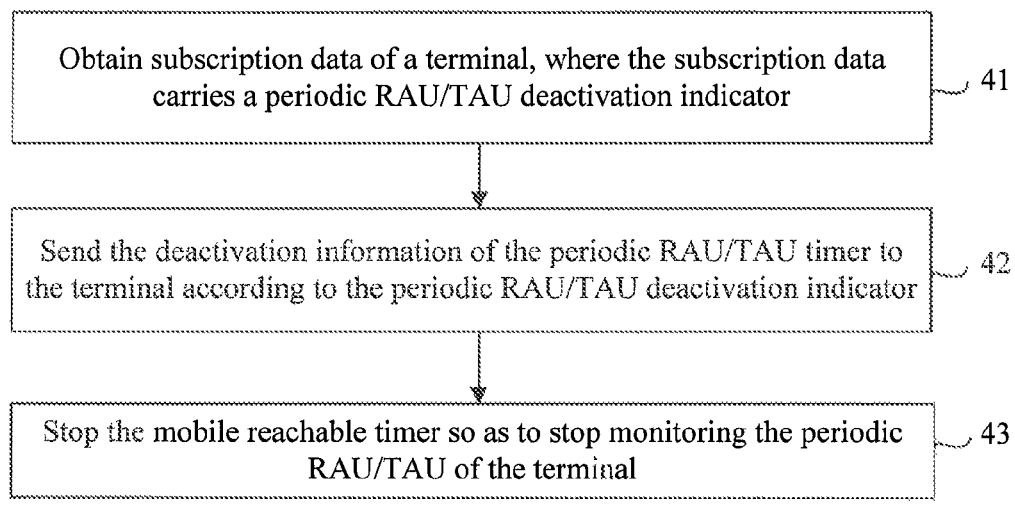
FIG. 4 is a flowchart of another mobility management method according to an embodiment of the present invention.

As shown in FIG. 4, another mobility management method according to an embodiment of the present invention includes the following steps:

Step 41: Obtain subscription data of a terminal, where the subscription data carries a periodic RAU/TAU deactivation indicator.

The SGSN/MME may use one of the following two ways to obtain the periodic RAU/TAU deactivation indicator of the terminal from the HLR/HSS:

First way: In the attach procedure of the terminal, when the SGSN/MME receives an Attach Request from the terminal, the SGSN/MME sends an Update Location message to the HLR/HSS and receives the subscription data sent by the HLR/HSS, where the subscription data carries the periodic RAU/TAU deactivation indicator.

Second way: If the terminal has attached, when the HLR/HSS needs to reset the periodic RAU/TAU of the terminal, the HLR/HSS sends new subscription data to the SGSN/MME, where the subscription data carries the periodic RAU/TAU deactivation indicator. The scenarios where the HLR/HSS resets the periodic RAU/TAU of the terminal include a scenario where the HLR/HSS has previously set the periodic RAU/TAU of the terminal or a scenario where the terminal uses a normal periodic RAU/TAU timer.

The periodic RAU/TAU deactivation indicator carried in the subscription data may be a deactivation indicator of the periodic RAU/TAU timer or a value of the periodic RAU/TAU timer that is set to zero. At this time, the SGSN/MME skips the operation of obtaining the normal periodic RAU/TAU timer.

Step 42: Send the deactivation information of the periodic RAU/TAU timer to the terminal according to the periodic RAU/TAU deactivation indicator.

The SGSN/MME may use either of the following ways to send the deactivation information of the periodic RAU/TAU timer to the terminal according to the received periodic RAU/TAU deactivation indicator of the terminal:

The used value unit of the periodic RAU/TAU timer indicates that the timer is deactivated, for example, the value unit of the periodic RAU/TAU timer may be set to a binary value "111" (timer value unit=111);

or, the value of the periodic RAU/TAU timer is set to zero (timer value=0).

Step 43: Stop the mobile reachable timer so as to stop monitoring the periodic RAU/TAU of the terminal.

At this time, the SGSN/MME stops the mobile reachable timer and stops monitoring the periodic RAU/TAU of the terminal.

Optionally, when the periodic RAU/TAU of the terminal needs to be reactivated, the HLR/TAU may modify the subscription data in the SGSN/MME to activate the periodic RAU/TAU of the terminal. Therefore, the mobility management method according to the embodiment of the present invention may also include the following:

The SGSN/MME obtains the subscription data of the terminal again, where the subscription data carries a periodic RAU/TAU activation indicator; and the SGSN/MME activates the periodic RAU/TAU of the terminal according to the periodic RAU/TAU activation indicator.

The SGSN/MME may use one of the following two ways to activate the periodic RAU/TAU of the terminal according to the periodic RAU/TAU activation indicator:

First way: The SGSN/MME sends a Detach Request message to the terminal to instruct the terminal to re-initiate an attach procedure, and activate the periodic RAU/TAU of the terminal through the attach procedure re-initiated by the terminal.

Specifically, after receiving the Attach Request of the terminal, the SGSN/MME obtains the normal periodic RAU/TAU timer, and sends an Attach Accept message to the terminal, where the Attach Accept message carries the normal periodic RAU/TAU timer; and then, the SGSN/MME sets a value, which is a little longer than the normal periodic RAU/TAU timer, as a mobile reachable timer for monitoring the periodic RAU/TAU of the terminal.

Second way: After receiving the RAU/TAU Request initiated by the terminal, the SGSN/MME activates the periodic RAU/TAU of the terminal through the RAU/TAU Accept message.

Specifically, after receiving the RAU/TAU Request initiated by the terminal, the SGSN/MME obtains the normal periodic RAU/TAU timer, and sends a RAU/TAU Accept message to the terminal, where the RAU/TAU Accept message carries the normal periodic RAU/TAU timer; and then, the SGSN/MME sets a value, which is a little longer than the normal periodic RAU/TAU timer, as a mobile reachable timer for monitoring the periodic RAU/TAU of the terminal.

The mobility management method according to the embodiment of the present invention obtains the periodic RAU/TAU deactivation indicator of the network with respect to the terminal through the subscription data, sends the deactivation information of the periodic RAU/TAU timer to the terminal according to the periodic RAU/TAU deactivation indicator, and meanwhile stops the mobile reachable timer so as to stop monitoring the periodic RAU/TAU of the terminal. As a result, the mobility management frequency of a particular terminal may be decreased, and the utilization of network resources is improved. In addition, when the network needs to activate the periodic RAU/TAU of the terminal, the subscription data in the SGSN/MME may be modified again, thereby achieving the objective of setting or dynamically modifying the mobility management frequency of a particular terminal, and solving the problem that the prior art cannot set or dynamically modify the mobility management frequency of a particular terminal among numerous terminals.

Figure 5:
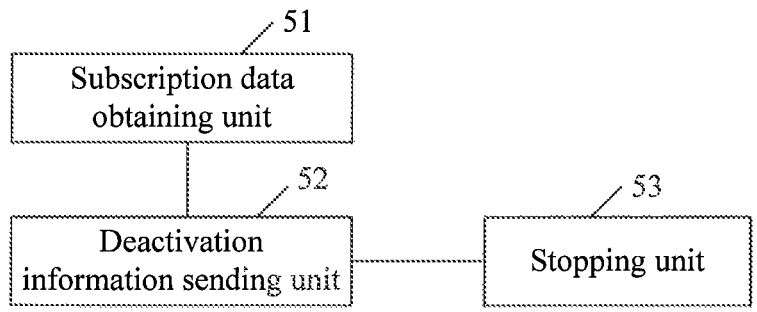
FIG. 5 is a first schematic structural diagram of another SGSN/MME according to an embodiment of the present invention.

Based on the mobility management method according to the embodiment of the present invention, as shown in FIG. 5, an embodiment of the present invention provides another SGSN/MME, including:

a subscription data obtaining unit 51, configured to obtain subscription data of a terminal, where the subscription data carries a periodic RAU/TAU deactivation indicator;

a deactivation information sending unit 52, configured to send deactivation information of a periodic RAU/TAU timer to the terminal according to the periodic RAU/TAU deactivation indicator; and a stopping unit 53, configured to stop a mobile reachable timer so as to stop monitoring the periodic RAU/TAU of the terminal.

Figure 6:
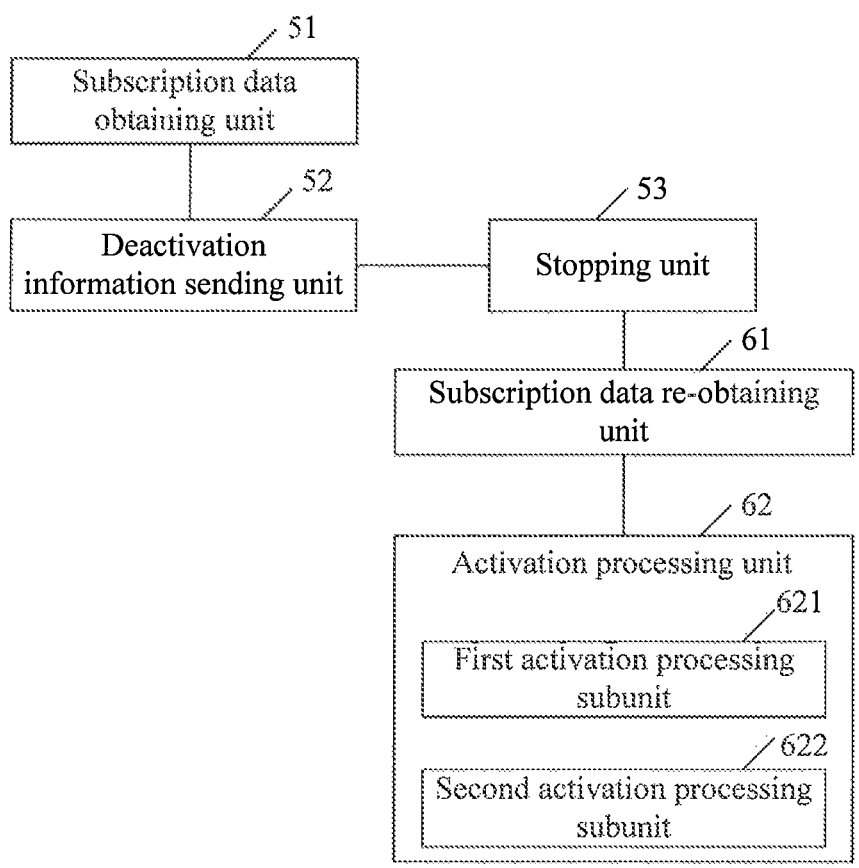
FIG. 6 is a second schematic structural diagram of another SGSN/MME according to an embodiment of the present invention.

Optionally, as shown in FIG. 6, the SGSN/MME may also include:

a subscription data re-obtaining unit 61, configured to re-obtain the subscription data of the terminal, where the subscription data carries a periodic RAU/TAU activation indicator; and an activation processing unit 62, configured to activate the periodic RAU/TAU of the terminal according to the periodic RAU/TAU activation indicator.

And further, the activation processing unit 62 may include:

a first activation processing subunit 621, configured to send a Detach Request message to the terminal to instruct the terminal to re-initiate an attach procedure, and activate the periodic RAU/TAU of the terminal through the attach procedure re-initiated by the terminal; or a second activation processing subunit 622, configured to activate, after receiving the RAU/TAU Request initiated by the terminal, the periodic RAU/TAU of the terminal through the RAU/TAU Accept message.

For the specific implementation method of the SGSN/MME according to this embodiment of the present invention, reference may be made to another mobility management method according to the embodiment of the present invention, which is not described here again.

In the SGSN/MME according to this embodiment of the present invention, the subscription data obtaining unit 51 obtains the periodic RAU/TAU deactivation indicator of the network with respect to the terminal, the deactivation information sending unit 52 sends the deactivation information of the periodic RAU/TAU timer to the terminal according to the periodic RAU/TAU deactivation indicator, and meanwhile the stopping unit 53 stops the mobile reachable timer so as to stop monitoring the periodic RAU/TAU of the terminal. As a result, the mobility management frequency of a particular terminal may be decreased, and the utilization of network resources may be improved. In addition, when the network needs to activate the periodic RAU/TAU of the terminal, the subscription data re-obtaining unit 61 may obtain the periodic RAU/TAU activation indicator of the network with respect to the terminal, and the activation processing unit 62 activates the periodic RAU/TAU of the terminal according to the periodic RAU/TAU activation indicator, thereby achieving the objective of setting or dynamically modifying the mobility management frequency of a particular terminal, and solving the problem that the prior art cannot set or dynamically modify the mobility management frequency of a particular terminal among numerous terminals.

In order to enable those skilled in the art to understand the technical solution of the embodiments of the present invention more clearly, the mobility management method according to the embodiments of the present invention is described below in detail with reference to specific embodiments.

First Embodiment:

In the attach procedure of the terminal, the SGSN/MME obtains the subscription data from the HLR/HSS, where the subscription data instructs the SGSN/MME to deliver a special periodic RAU/TAU timer (as opposed to the normal periodic RAU/TAU timer) to the terminal.

Figure 7:
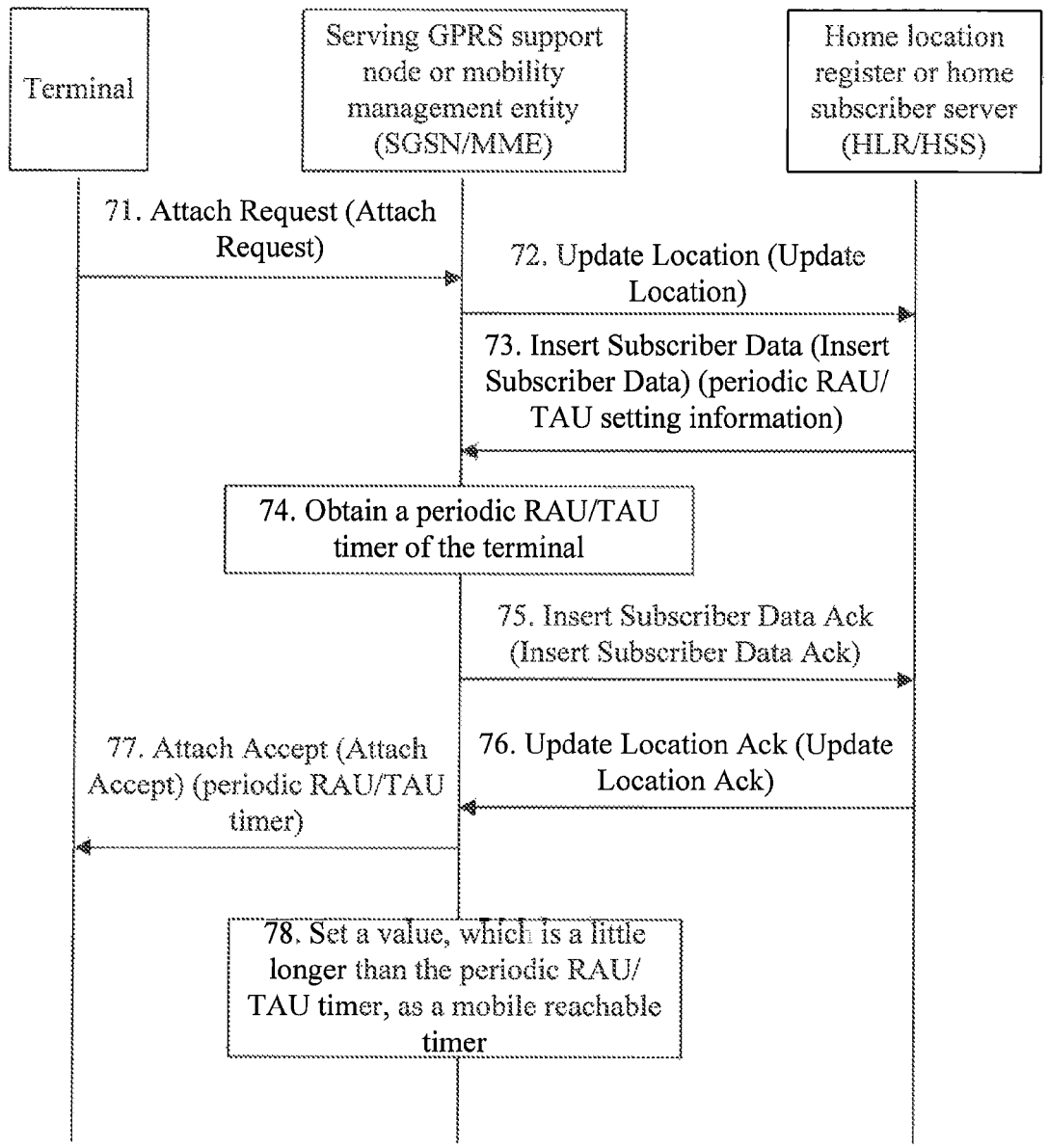
FIG. 7 is a sequence chart of a mobility management method according to a first embodiment of the present invention.

As shown in FIG. 7, the mobility management method according to this embodiment includes the following steps:

Step 71: The terminal initiates an Attach Request (Attach Request) to the SGSN/MME.

Step 72: The SGSN/MME sends an Update Location (Update Location) message to the HLR/HSS.

Step 73: The HLR/HSS sends an Insert Subscriber Data (Insert Subscriber Data) message (the subscriber data is known as subscription data) to the SGSN/MME, where the message carries the periodic RAU/TAU setting information.

The periodic RAU/TAU setting information may take any one of the following three ways: a. a multiplication factor of the normal periodic RAU/TAU timer; b. directly giving a specified periodic RAU/TAU timer; and c. an increment value of the normal periodic RAU/TAU timer.

Step 74: The SGSN/MME obtains a periodic RAU/TAU timer of the terminal according to the periodic RAU/TAU setting information.

There are three possible ways for the SGSN/MME to process the received periodic RAU/TAU setting information: a. obtaining the normal periodic RAU/TAU timer, and multiplying the normal periodic RAU/TAU timer with the multiplication factor to obtain the periodic RAU/TAU timer of the terminal; b. directly using the specified periodic RAU/TAU timer as the periodic RAU/TAU timer of the terminal; and c. obtaining the normal periodic RAU/TAU timer, and adding the increment value to the normal periodic RAU/TAU timer to obtain the periodic RAU/TAU timer of the terminal.

Step 75: The SGSN/MME sends an Insert Subscriber Data Ack (Insert Subscriber Data Ack) message to the HLR/HSS.

Step 76: The HLR/HSS sends an Update Location Ack (Update Location Ack) message to the SGSN/MME.

Step 77: The SGSN/MME sends an Attach Accept (Attach Accept) message to the terminal, where the message carries the periodic RAU/TAU timer of the terminal.

Step 78: The SGSN/MME sets a value, which is a little longer than the periodic RAU/TAU timer of the terminal, as a mobile reachable timer (Mobile Reachable Timer) for monitoring the subsequent periodic RAU/TAU of the terminal.

Second Embodiment:

If the terminal has attached, the HLR/HSS initiates a modification of the subscription data in the SGSN/MME, instructing the SGSN/MME to modify the periodic RAU/TAU timer of the terminal.

Figure 8:
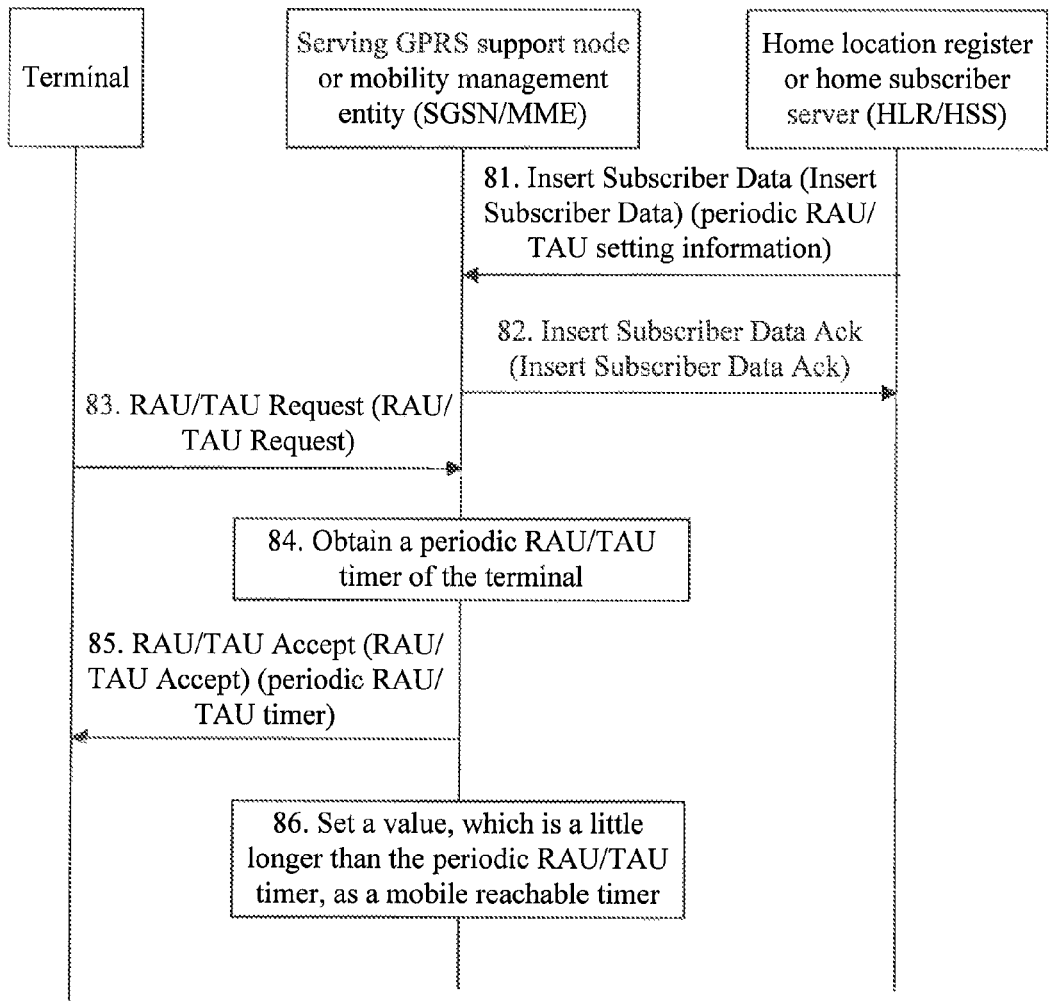
FIG. 8 is a sequence chart of a mobility management method according to a second embodiment of the present invention.

As shown in FIG. 8, the mobility management method according to this embodiment includes the following steps:

Step 81: The HLR/HSS sends an Insert Subscriber Data (Insert Subscriber Data) message to the SGSN/MME, where the message carries the periodic RAU/TAU setting information.

The periodic RAU/TAU setting information may take any one of the following three ways: a. a multiplication factor of the normal periodic RAU/TAU timer; b. directly giving a specified periodic RAU/TAU timer; and c. an increment value of the normal periodic RAU/TAU timer.

Step 82: The SGSN/MME sends an Insert Subscriber Data Ack (Insert Subscriber Data Ack) message to the HLR/HSS.

Step 83: The terminal initiates a RAU/TAU Request (RAU/TAU Request) to the SGSN/MME.

The update type (Update Type) may be a RAU/TAU or a periodic RAU/TAU.

Step 84: The SGSN/MME obtains a periodic RAU/TAU timer of the terminal according to the periodic RAU/TAU setting information.

Being triggered by the RAU/TAU Request of the terminal, the SGSN/MME executes three kinds of possible processing: a. obtaining the normal periodic RAU/TAU timer and multiplying the normal periodic RAU/TAU timer with the multiplication factor to obtain the periodic RAU/TAU timer of the terminal; b. directly using the specified periodic RAU/TAU timer as the periodic RAU/TAU timer of the terminal; and c. obtaining the normal periodic RAU/TAU timer and adding the increment value to the normal periodic RAU/TAU timer to obtain the periodic RAU/TAU timer of the terminal.

Step 85: The SGSN/MME sends a RAU/TAU Accept (RAU/TAU Accept) message to the terminal, where the message carries the periodic RAU/TAU timer of the terminal.

Step 86: The SGSN/MME sets a value, which is a little longer than the periodic RAU/TAU timer of the terminal, as a mobile reachable timer (Mobile Reachable Timer) for monitoring the subsequent periodic RAU/TAU of the terminal.

In the mobility management methods according to the first embodiment and the second embodiment, the subscription data instructs the SGSN/MME to deliver the special periodic RAU/TAU timer for the terminal, thereby achieving the objective of setting or dynamically modifying the mobility management frequency of a particular terminal, and solving the problem that the prior art cannot set or dynamically modify the mobility management frequency of a particular terminal among numerous terminals.

Third Embodiment:

In the attach procedure of the terminal, the SGSN/MME obtains the subscription data from the HLR/HSS, where the subscription data instructs the SGSN/MME to deactivate the periodic RAU/TAU timer of the terminal.

Figure 9:
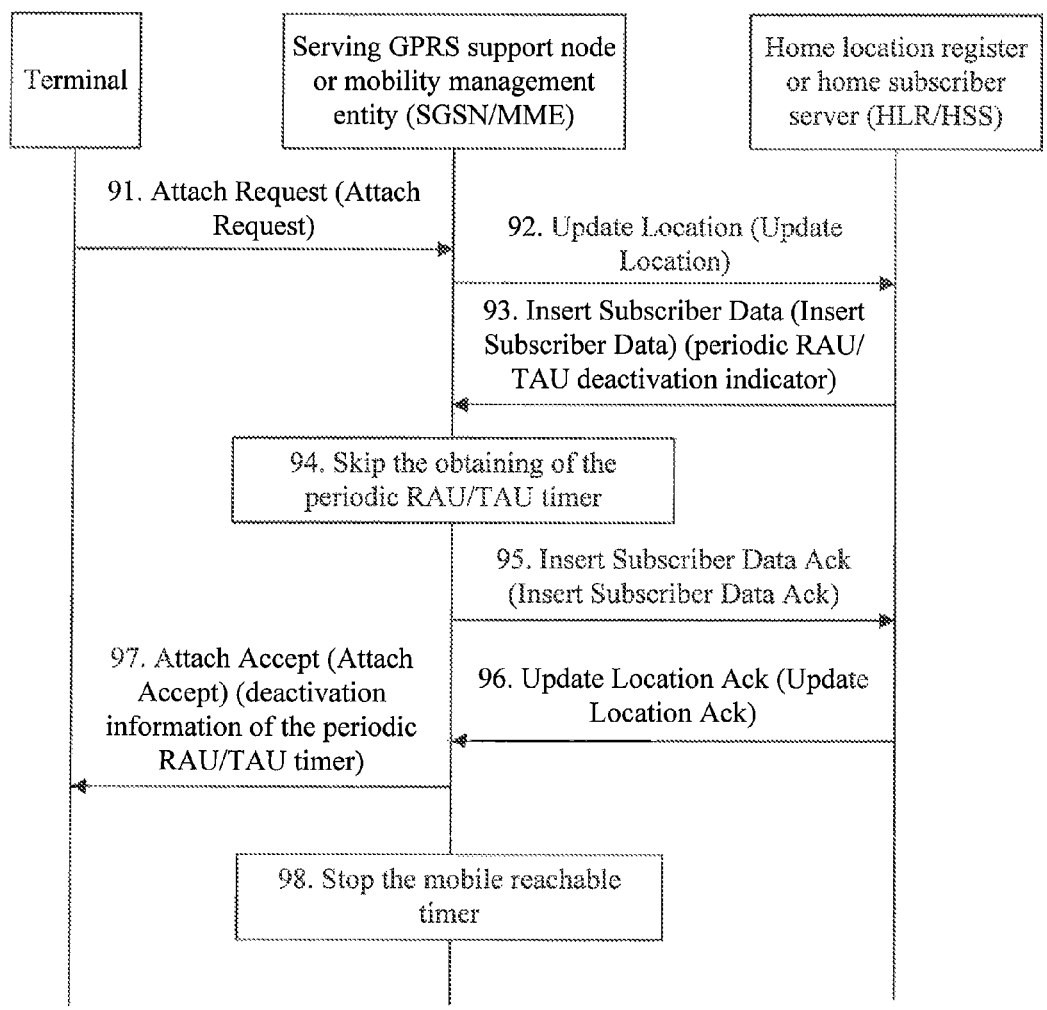
FIG. 9 is a sequence chart of a mobility management method according to a third embodiment of the present invention.

As shown in FIG. 9, the mobility management method according to this embodiment includes the following steps:

Step 91: The terminal initiates an Attach Request (Attach Request) to the SGSN/MME.

Step 92: The SGSN/MME sends an Update Location (Update Location) message to the HLR/HSS.

Step 93: The HLR/HSS sends an Insert Subscriber Data (Insert Subscriber Data) message to the SGSN/MME, where the message carries a periodic RAU/TAU deactivation indicator.

The periodic RAU/TAU deactivation indicator may directly indicate that the periodic RAU/TAU timer of the terminal is deactivated or that the periodic RAU/TAU timer is zero. It may be understood that the periodic RAU/TAU deactivation indicator may also be referred to as periodic RAU/TAU deactivation setting information.

Step 94: The SGSN/MME skips the operation of obtaining the normal periodic RAU/TAU timer.

Step 95: The SGSN/MME sends an Insert Subscriber Data Ack (Insert Subscriber Data Ack) message to the HLR/HSS.

Step 96: The HLR/HSS sends an Update Location Ack (Update Location Ack) message to the SGSN/MME.

Step 97: The SGSN/MME sends an Attach Accept (Attach Accept) message to the terminal, where the message carries the deactivation information of the periodic RAU/TAU timer.

The deactivation information of the periodic RAU/TAU timer may take either of the following ways: setting the value unit of the periodic RAU/TAU timer to a binary value "111" (timer value unit=111) or setting the value of the periodic RAU/TAU timer to zero (timer value=0), to indicate that the periodic RAU/TAU timer is deactivated.

Step 98: The SGSN/MME stops the mobile reachable timer (Mobile Reachable Timer) so as to stop monitoring the subsequent periodic RAU/TAU of the terminal.

It is worth noting that if the terminal has attached, the HLR/HSS may also initiate the modification of the subscription data in the SGSN/MME, instructing the SGSN/MME to deactivate the periodic RAU/TAU timer of the terminal. The specific procedure may be similar to that of the foregoing second embodiment, and is not repeatedly described here.

In addition, if the periodic RAU/TAU of the terminal has been deactivated, when the periodic RAU/TAU of the terminal needs to be reactivated, the HLR/HSS may initiate the modification of the subscription data in the SGSN/MME, instructing the SGSN/MME to activate the periodic RAU/TAU of the terminal. The SGSN/MME may initiate a detach procedure to instruct the terminal to re-initiate an attach procedure, and activate the periodic RAU/TAU during a subsequent attach procedure of the terminal; or the SGSN/MME may activate the periodic. RAU/TAU through a location update procedure initiated by the terminal.

Figure 10:
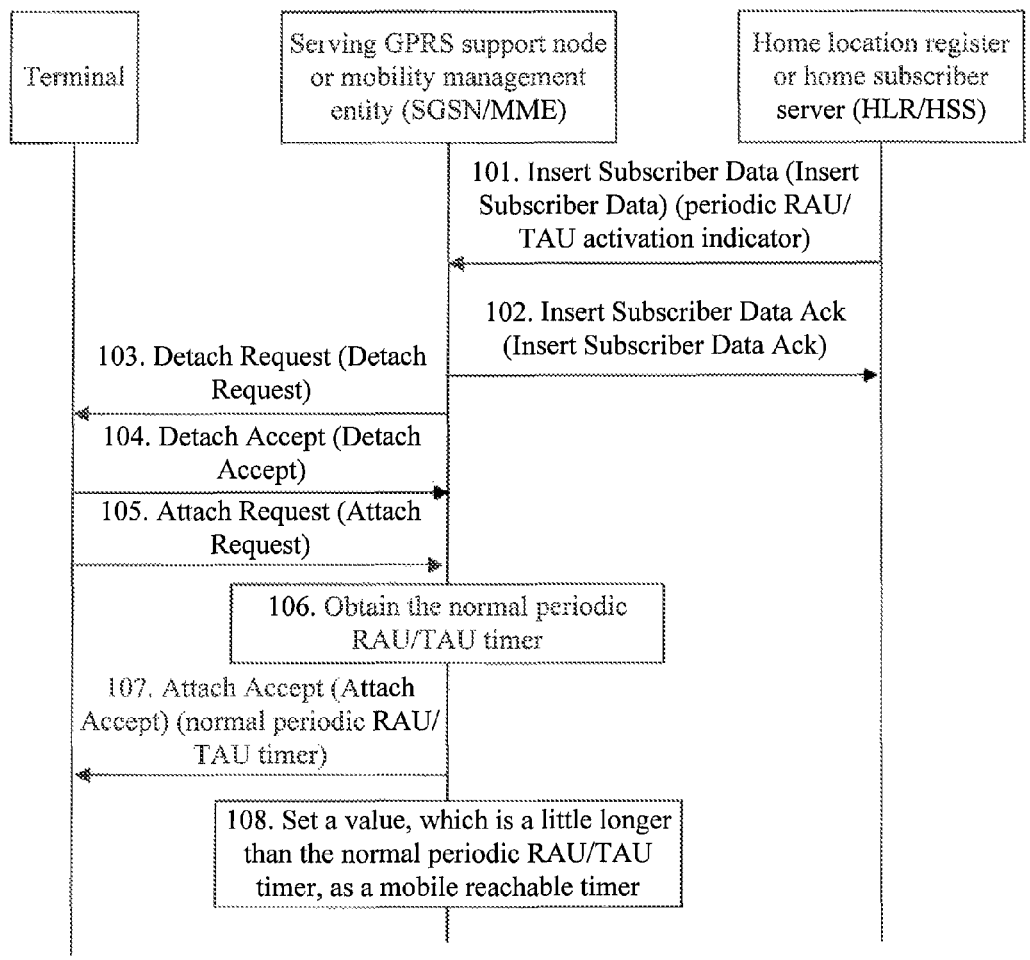
FIG. 10 is a sequence chart of an embodiment for activating a periodic RAU/TAU of a terminal according to the present invention.

As shown in FIG. 10, an embodiment for activating a periodic RAU/TAU of a terminal according to the present invention includes the following steps:

Step 101: The HLR/HSS sends an Insert Subscriber Data (Insert Subscriber Data) message to the SGSN/MME, where the message carries a periodic RAU/TAU activation indicator.

Step 102: The SGSN/MME sends an Insert Subscriber Data Ack (Insert Subscriber Data Ack) message to the HLR/HSS.

Step 103: The SGSN/MME sends a Detach Request (Detach Request) message to the terminal, where a detach type indicates that the terminal needs to attach again.

Step 104: The terminal sends a Detach Accept (Detach Accept) message to the SGSN/MME.

Step 105: The terminal sends an Attach Request (Attach Request) message to the SGSN/MME.

Step 106: The SGSN/MME obtains the normal periodic RAU/TAU timer.

Step 107: The SGSN/MME sends an Attach Accept (Attach Accept) message to the terminal, where the message carries the obtained normal periodic RAU/TAU timer.

Step 108: The SGSN/MME sets a value, which is a little longer than the normal periodic RAU/TAU timer, as a mobile reachable timer (Mobile Reachable Timer) for monitoring the subsequent periodic RAU/TAU of the terminal.

Figure 11:
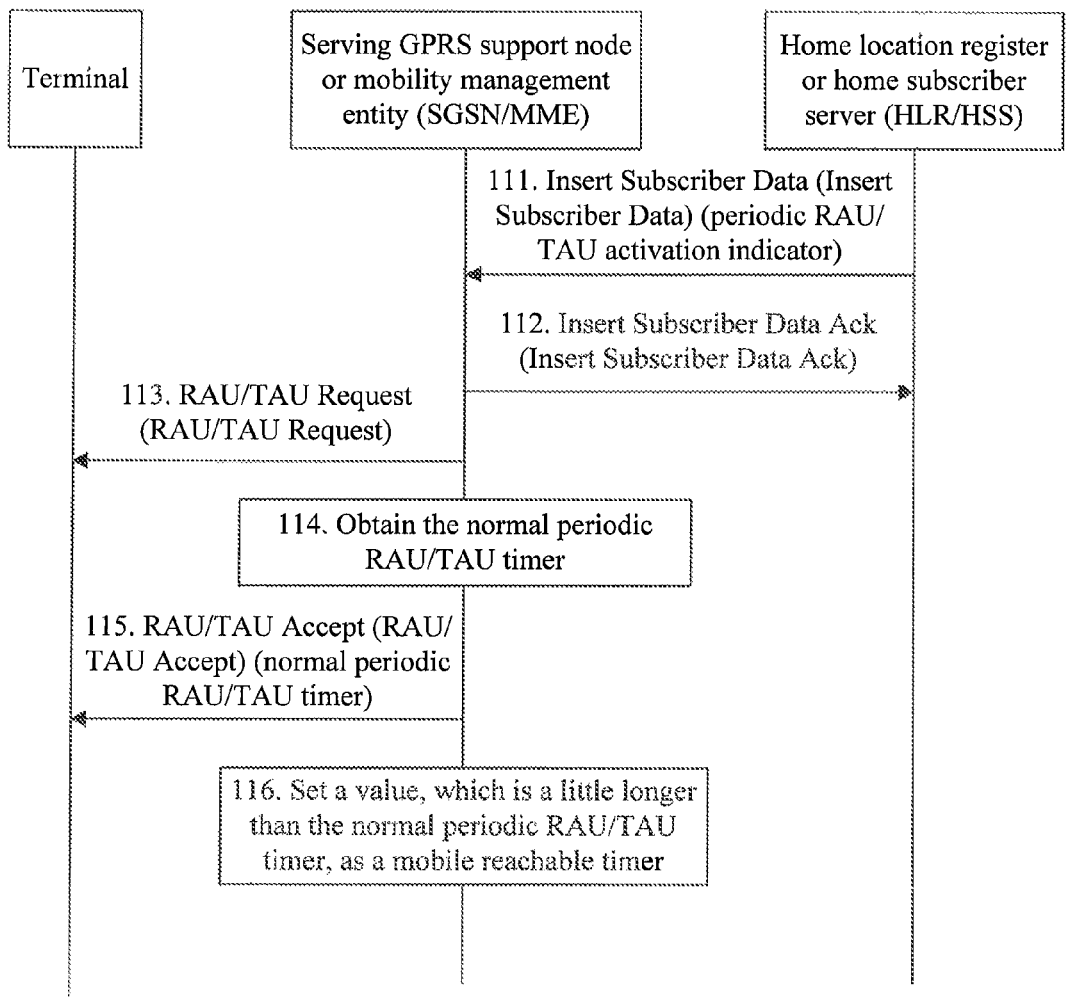
FIG. 11 is a sequence chart of another embodiment for activating a periodic RAU/TAU of a terminal according to the present invention.

As shown in FIG. 11, another embodiment for activating a periodic RAU/TAU of a terminal according to the present invention includes the following steps:

Step 111: The HLR/HSS sends an Insert Subscriber Data (Insert Subscriber Data) message to the SGSN/MME, where the message carries a periodic RAU/TAU activation indicator.

Step 112: The SGSN/MME sends an Insert Subscriber Data Ack (Insert Subscriber Data Ack) message to the HLR/HSS.

Step 113: The terminal actively sends a Location Update Request (RAU/TAU Request) message to the SGSN/MME.

Step 114: The SGSN/MME obtains the normal periodic RAU/TAU timer.

Step 115: The SGSN/MME sends a Location Update Accept (RAU/TAU Accept) message to the terminal, where the message carries the obtained normal periodic RAU/TAU timer.

Step 116: The SGSN/MME sets a value, which is a little longer than the normal periodic RAU/TAU timer, as a mobile reachable timer (Mobile Reachable Timer) for monitoring the subsequent periodic RAU/TAU of the terminal.

In the mobility management method according to the third embodiment, the SGSN/MME is instructed by the subscription data to deactivate the periodic RAU/TAU of the terminal. As a result, the mobility management frequency of a particular terminal may be decreased, and the utilization of network resources may be improved. In addition, when the periodic RAU/TAU of the terminal needs to be activated, the SGSN/MME is instructed again by the subscription data to activate the periodic RAU/TAU of the terminal, thereby achieving the objective of setting or dynamically modifying the mobility management frequency of a particular terminal, and solving the problem that the prior art cannot set or dynamically modify the mobility management frequency of a particular terminal among numerous terminals.

Figure 12:
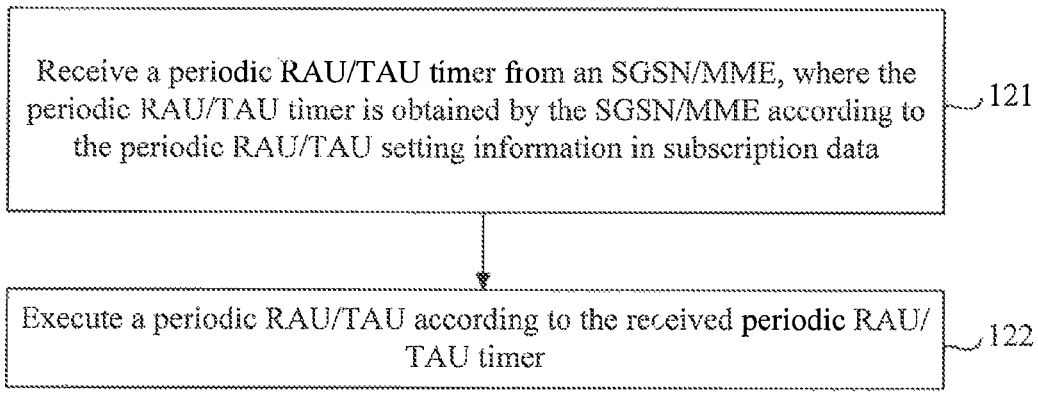
FIG. 12 is a flowchart of a mobility management method for a terminal according to an embodiment of the present invention.

For the terminal, as shown in FIG. 12, a mobility management method according to an embodiment of the present invention includes the following steps:

Step 121: Receive a periodic RAU/TAU timer from an SGSN/MME, where the periodic RAU/TAU timer is obtained by the SGSN/MME according to the periodic RAU/TAU setting information in subscription data; and Step 122: Execute a periodic RAU/TAU according to the received periodic RAU/TAU timer.

The periodic RAU/TAU setting information in the subscription data may include: a multiplication factor of the normal periodic RAU/TAU timer; or a specified periodic RAU/TAU timer; or an increment value of the normal periodic RAU/TAU timer.

The terminal may receive the periodic RAU/TAU timer from the SGSN/MME in the following ways: sending an Attach Request message to the SGSN/MME, and receiving the periodic RAU/TAU timer through an Attach Accept message; or sending a RAU/TAU Request message to the SGSN/MME, and receiving the periodic RAU/TAU timer through a RAU/TAU Accept message.

And, in order to support a longer RAU/TAU interval than that of the prior art, the code of the value unit of the periodic RAU/TAU timer received by the terminal may include: 011, or 100, or 101, or 110, and the value unit is larger than 6 minutes. For example, the following definitions may be applied: 011 means that the unit is 1 hour, 100 means that the unit is 10 hours, 101 means that the unit is 100 hours, and 110 means that the unit is 1000 hours; or 011 means that the unit is 1 hour, 100 means that the unit is 1 day, 101 means that the unit is 1 week, 110 means that the unit is 1 month, and so on.

Figure 13:
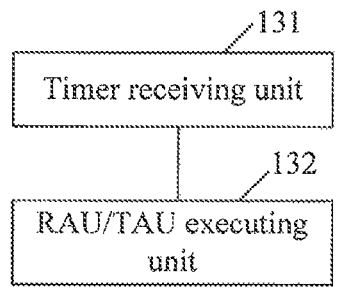
FIG. 13 is a schematic structural diagram of a terminal according to an embodiment of the present invention.

Based on the mobility management method, as shown in FIG. 13, an embodiment of the present invention also provides a terminal, including:

a timer receiving unit 131, configured to receive a periodic RAU/TAU timer from an SGSN/MME, where the periodic RAU/TAU timer is obtained by the SGSN/MME according to the periodic RAU/TAU setting information in the subscription data; and a RAU/TAU executing unit 132, configured to execute a periodic. RAU/TAU according to the received periodic RAU/TAU timer.

In the mobility management method and the terminal according to the embodiments of the present invention, the terminal receives the periodic RAU/TAU timer that is obtained by the SGSN/MME according to the periodic RAU/TAU setting information in the subscription data, and executes a periodic RAU/TAU according to the received periodic RAU/TAU timer. Thereby, the mobility management frequency of a particular terminal among numerous terminals can be set or dynamically modified in cooperation with the network.

Figure 14:
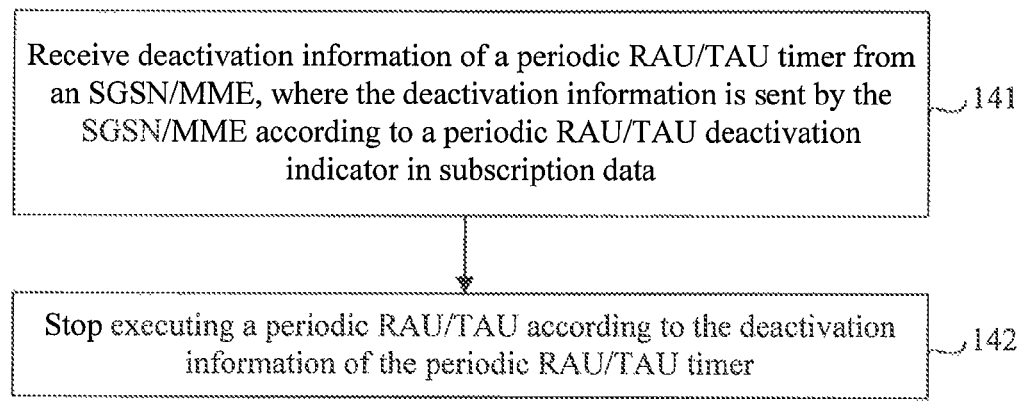
FIG. 14 is a first flowchart of another mobility management method for a terminal according to an embodiment of the present invention.

For the terminal, as shown in FIG. 14, another mobility management method according to an embodiment of the present invention includes the following steps:

Step 141: Receive deactivation information of a periodic RAU/TAU timer from an SGSN/MME, where the deactivation information is sent by the SGSN/MME according to a periodic RAU/TAU deactivation indicator in subscription data.

Step 142: Stop executing a periodic RAU/TAU according to the received deactivation information of the periodic RAU/TAU timer.

The deactivation information of the periodic RAU/TAU timer received by the terminal includes: the value unit of the periodic RAU/TAU timer indicating that the timer is deactivated; or the value of the periodic RAU/TAU timer that is set to zero.

Figure 15:
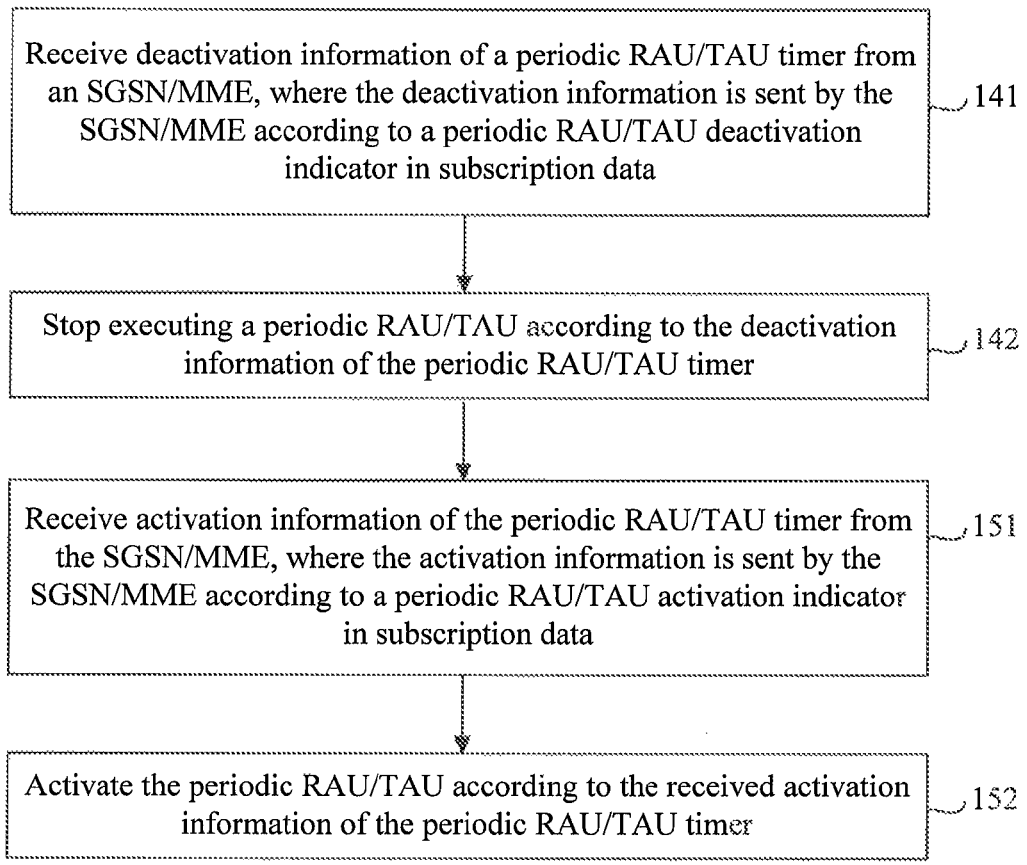
FIG. 15 is a second flowchart of another mobility management method for a terminal according to an embodiment of the present invention.

If the periodic RAU/TAU of the terminal has been deactivated, optionally, the mobility management method according to the embodiment of the present invention, as shown in FIG. 15, may also include the following steps:

Step 151: Receive activation information of the periodic RAU/TAU timer from the SGSN/MME, where the activation information is sent by the SGSN/MME according to a periodic RAU/TAU activation indicator in subscription data.

Step 152: Activate the periodic RAU/TAU according to the received activation information of the periodic RAU/TAU timer.

Figure 16:
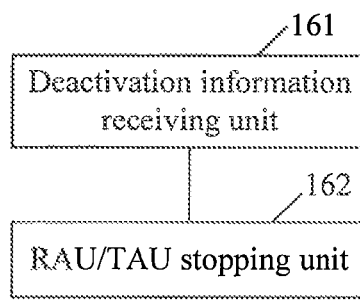
FIG. 16 is a first schematic structural diagram of another terminal according to an embodiment of the present invention.

Based on the mobility management method, as shown in FIG. 16, an embodiment of the present invention provides another terminal, including:

a deactivation information receiving unit 161, configured to receive deactivation information of a periodic RAU/TAU timer from an SGSN/MME, where the deactivation information is sent by the SGSN/MME according to a periodic RAU/TAU deactivation indicator in subscription data; and a RAU/TAU stopping unit 162, configured to stop executing a periodic RAU/TAU according to the deactivation information of the periodic RAU/TAU timer received by the deactivation information receiving unit.

Figure 17:
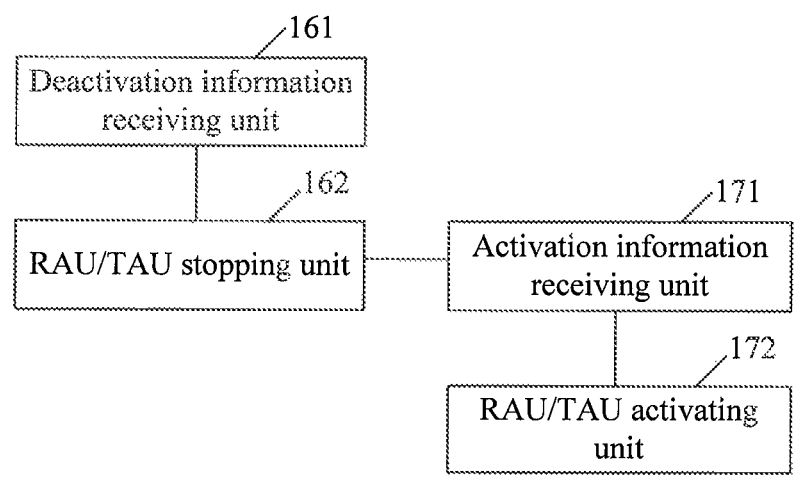
FIG. 17 is a second schematic structural diagram of another terminal according to an embodiment of the present invention.

Optionally, as shown in FIG. 17, the terminal according to the embodiment of the present invention may also include:

an activation information receiving unit 171, configured to receive activation information of a periodic RAU/TAU timer from an SGSN/MME, where the activation information is sent by the SGSN/MME according to a periodic RAU/TAU activation indicator in subscription data; and a RAU/TAU activating unit 172, configured to activate a periodic RAU/TAU according to the activation information of the periodic RAU/TAU timer received by the activation information receiving unit.

In the mobility management method and the terminal according to the embodiments of the present invention, the terminal receives the deactivation information of the periodic RAU/TAU timer that is sent by the SGSN/MME according to the periodic RAU/TAU deactivation indicator in the subscription data, and stops executing the periodic RAU/TAU according to the received deactivation information of the periodic RAU/TAU timer. Thereby, the mobility management frequency of a particular terminal among numerous terminals can be set or dynamically modified in cooperation with the network.

In summary, the mobility management methods according to the embodiments of the present invention may be applied in low-mobility machine-type communication (Machine-Type Communication, MTC). MTC is a kind of data communication and relates to one or more entities not requiring any interaction with a natural person. In low-mobility MTC applications, such as a family health monitoring device, an automatic vending machine, a water meter/ammeter, hydrological monitoring, forest fire monitoring, and bridge monitoring, the terminal device is stationary permanently, or moves infrequently, for example, moving only once a week, or moving only in a certain area, such as moving in a cell (Cell), moving in one or more location areas (Location Areas, LAs)/routing areas (Routing Areas, RAs)/tracking areas (Tracking Areas, TAs). Therefore, the utilization of network resources may be improved by setting or dynamically modifying the mobility management frequency of a particular MTC terminal (or called an MTC device) among numerous terminals.

Persons skilled in the art may understand that all or part of steps in the methods of the above embodiments may be implemented by relevant hardware instructed by a program. The program may be stored in a computer readable storage medium, such as a ROM/RAM, a magnetic disk, and an optical disk.

The above are only exemplary embodiments of the present invention, but the protection scope of the present invention is not limited thereto. Any modification or substitution readily conceivable by those skilled in the art within the scope of the technology disclosed in the present invention shall be covered within the protection scope of the present invention. Therefore, the protection scope of the present invention is subject to the appended claims.

What is claimed is:

1. A mobility management method, comprising:
obtaining, by a Serving GPRS Support Node or Mobility Management Entity (SGSN/MME), subscription data of a terminal from a Home Location Register or Home Subscriber Server (HLR/HSS), wherein the subscription data carries periodic routing area update or tracking area update setting information;
obtaining, by the SGSN/MME, a periodic routing area update or tracking area update timer of the terminal according to the periodic routing area update or tracking area update setting information;
sending, by the SGSN/MME, the periodic routing area update or tracking area update timer of the terminal to the terminal; and
setting, by the SGSN/MME, a value, which is longer than the periodic routing area update or tracking area update timer of the terminal, as a mobile reachable timer for monitoring a periodic routing area update or tracking area update of the terminal,
wherein the periodic routing area update or tracking area update setting information carried in the subscription data comprises:
a multiplication factor of a normal periodic routing area update or tracking area update timer; or a specified periodic routing area update or tracking area update timer; or an increment value of the normal periodic routing area update or tracking area update timer,
and wherein the obtaining the periodic routing area update or tracking area update timer of the terminal according to the periodic routing area update or tracking area update setting information comprises:
when the periodic routing area update or tracking area update setting information is the multiplication factor of the normal periodic routing area update or tracking area update timer, obtaining the normal periodic routing area update or tracking area update timer and multiplying the normal periodic routing area update or tracking area update timer with the multiplication factor to obtain the periodic routing area update or tracking area update timer of the terminal; or when the periodic routing area update or tracking area update setting information is the specified periodic routing area update or tracking area update timer, directly using the specified periodic routing area update or tracking area update timer as the periodic routing area update or tracking area update timer of the terminal; or when the periodic routing area update or tracking area update setting information is the increment value of the normal periodic routing area update or tracking area update timer, obtaining the normal periodic routing area update or tracking area update timer and adding the increment value to the normal periodic routing area update or tracking area update timer to obtain the periodic routing area update or tracking area update timer of the terminal.

2. A serving GPRS support node or mobility management entity, comprising:

a subscription data obtaining unit, configured to obtain subscription data of a terminal from a Home Location Register/Home Subscriber Server (HLR/HSS), wherein the subscription data carries periodic routing area update or tracking area update setting information;

a timer obtaining unit, configured to obtain a periodic routing area update or tracking area update timer of the terminal according to the periodic routing area update or tracking area update setting information;

a timer sending unit, configured to send the periodic routing area update or tracking area update timer of the terminal to the terminal; and a setting unit, configured to set a value, which is longer than the periodic routing area update or tracking area update timer of the terminal, as a mobile reachable timer for monitoring a periodic routing area update or tracking area update of the terminal, wherein the timer obtaining unit comprises:

a first obtaining subunit, configured to obtain, when the periodic routing area update or tracking area update setting information is a multiplication factor of a normal periodic routing area update or tracking area update timer, the normal periodic routing area update or tracking area update timer and multiply the normal periodic routing area update or tracking area update timer with the multiplication factor to obtain the periodic routing area update or tracking area update timer of the terminal; or a second obtaining subunit, configured to directly use, when the periodic routing area update or tracking area update setting information is a specified periodic routing area update or tracking area update timer, the specified periodic routing area update or tracking area update timer as the periodic routing area update or tracking area update timer of the terminal; or a third obtaining subunit, configured to obtain, when the periodic routing area update or tracking area update setting information is an increment value of the normal periodic routing area update or tracking area update timer, the normal periodic routing area update or tracking area update timer and add the increment value to the normal periodic routing area update or tracking area update timer to obtain the periodic routing area update or tracking area update timer of the terminal.

3. A mobility management method, comprising:

obtaining, by a Serving GPRS Support Node or Mobility Management Entity (SGSN/MME), subscription data of a terminal from a Home Location Register or Home Subscriber Server (HLR/HSS), wherein the subscription data carries periodic routing area update or tracking area update setting information;

obtaining, by the SGSN/MME, a periodic routing area update or tracking area update timer of the terminal according to the periodic routing area update or tracking area update setting information; and sending, by the SGSN/MME, the periodic routing area update or tracking area update timer of the terminal to the terminal, wherein the periodic routing area update or tracking area update setting information carried in the subscription data comprises:

a multiplication factor of a normal periodic routing area update or tracking area update timer; or a specified periodic routing area update or tracking area update timer; or an increment value of the normal periodic routing area update or tracking area update timer, and wherein the obtaining the periodic routing area update or tracking area update timer of the terminal according to the periodic routing area update or tracking area update setting information comprises:

when the periodic routing area update or tracking area update setting information is the multiplication factor of the normal periodic routing area update or tracking area update timer, obtaining the normal periodic routing area update or tracking area update timer and multiplying the normal periodic routing area update or tracking area update timer with the multiplication factor to obtain the periodic routing area update or tracking area update timer of the terminal; or when the periodic routing area update or tracking area update setting information is the specified periodic routing area update or tracking area update timer, directly using the specified periodic routing area update or tracking area update timer as the periodic routing area update or tracking area update timer of the terminal; or when the periodic routing area update or tracking area update setting information is the increment value of the normal periodic routing area update or tracking area update timer, obtaining the normal periodic routing area update or tracking area update timer and adding the increment value to the normal periodic routing area update or tracking area update timer to obtain the periodic routing area update or tracking area update timer of the terminal.

\* \* \* \* \*